United States Patent
Hasegawa et al.

(10) Patent No.: US 11,262,489 B1
(45) Date of Patent: Mar. 1, 2022

(54) METHODS FOR INCREASING IR EMITTANCE OF THIN FILM SECOND SURFACE MIRRORED THERMAL CONTROL COATINGS

(71) Applicant: United States of America as represented by the Administrator of NASA, Washington, DC (US)

(72) Inventors: Mark M. Hasegawa, Highland, MD (US); Kenneth O'Connor, Greenbelt, MD (US); Grace M. Miller, Greenbelt, MD (US); Alfred Wong, Greenbelt, MD (US); George M. Harris, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 620 days.

(21) Appl. No.: 16/135,392

(22) Filed: Sep. 19, 2018

(51) Int. Cl.
  *G02B 5/08* (2006.01)
  *B64G 1/50* (2006.01)
  *C23C 28/00* (2006.01)

(52) U.S. Cl.
  CPC ............ *G02B 5/0875* (2013.01); *B64G 1/50* (2013.01); *C23C 28/321* (2013.01); *C23C 28/42* (2013.01)

(58) Field of Classification Search
  CPC ........ B64G 1/50–503; B64G 1/54–546; G02B 5/0875; G02B 5/0858
  See application file for complete search history.

(56) References Cited

U.S. PATENT DOCUMENTS

| | | | | |
|---|---|---|---|---|
| 3,635,751 A | * | 1/1972 | Long, III | C03C 17/3411 220/2.1 A |
| 2002/0036829 A1 | * | 3/2002 | Ohgane | G02B 17/086 359/586 |
| 2006/0156958 A1 | * | 7/2006 | Simmons | C04B 28/26 106/600 |
| 2006/0262436 A1 | * | 11/2006 | Shimada | G02B 5/0858 359/883 |
| 2009/0220802 A1 | * | 9/2009 | Faber | C23C 28/321 428/446 |
| 2014/0139904 A1 | * | 5/2014 | Hendaoui | G02F 1/21 359/288 |

* cited by examiner

*Primary Examiner* — Alex A Rolland
(74) *Attorney, Agent, or Firm* — Matthew F. Johnston; Bryan A. Geurts; Helen M. Galus

(57) ABSTRACT

A method of making a multi-layer coating on a substrate is provided and involves applying a mirror coating to a substrate then spraying a silicate topcoat onto the mirror coating. Applying the mirror coating can involve applying a reflective material to the substrate to form a reflective layer and applying an oxide layer to the reflective layer to form the mirror coating. The oxide layer can be made of one or more oxide layers, and each of the one or more oxide layers can include aluminum oxide, silicon oxide, or a combination thereof. The multi-layer coating provides increased IR emittance and decreased solar absorptance relative to conventional thermal control coatings.

12 Claims, No Drawings

METHODS FOR INCREASING IR EMITTANCE OF THIN FILM SECOND SURFACE MIRRORED THERMAL CONTROL COATINGS

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

FIELD OF THE INVENTION

The present invention relates to thermal control coatings, particularly for application on spacecraft.

BACKGROUND OF THE INVENTION

Coatings that exhibit high performance, stable optical radiative properties, such as low solar absorptance and high IR emittance, have been the focus of much developmental effort. Currently, the highest performing systems are optical solar reflector (OSR) mirrors that are made from a 75 micron or greater glass pane, coated with silver. These systems are costly, fragile, and must be bonded to flat/planar surfaces. They are challenging to cut and customize to curved surfaces and are heavy. Their maximum IR emittances are typically less than 0.80. Other radiative coating options include sprayable white coatings which can have higher IR emittances than the OSR technology and can be applied to complex geometries; however, their pigment constituents are not normally as stable as OSR systems and can degrade to solar absorptances as high as 0.40 in UV and radiation environments. Additionally, white sprayable coatings that have low surface resistivity, less than 1E6 ohm/square (i.e., less than $1 \times 10^6$ ohm/square) have neither low solar absorptances or optically stable in charging environments. Silver backed Teflon (Ag/FEP) systems have similar optical properties as the proposed system; however, the material is not stable in radiation environments, can be easily damaged during application, and are significantly heavier. Ag/FEP with a conductive layer is extremely prone to damage and loss of conductivity due to mere contact.

Historically, thin oxide film coatings have been limited to an upper bound emittance value of 0.70 using a combination of aluminum oxide and silicon oxide. Increased thicknesses of the oxide layers did not increase emittance but did decrease the structural stability and coating surface stresses.

SUMMARY OF THE INVENTION

According to the present invention, a method of making a multi-layer coating on a substrate is provided. The method can comprise applying a mirror coating to a substrate, for example, by a vapor deposition technique. A silicate topcoat material can then be applied to the mirror coating, for example, by a spraying technique, to form a multi-layered coating of the present invention. As an example, the mirror coating can be applied by a metal or metal oxide vapor deposition technique and the silicate topcoat can be applied by spraying a silicate topcoat material onto the mirror coating.

The mirror coating can be formed by first applying a reflective material to a substrate to form a reflective layer, and then applying one or more oxide layers to the reflective layer. The mirror coating can comprise one or more additional layers, for example, a base layer, a protective outer coating, or the like. The one or more oxide layers can comprise at least one layer of aluminum oxide, at least one layer of silicon oxide, or a combination thereof. The one or more oxide layers can comprise a plurality of layers, for example, one or more aluminum oxide layers, one or more silicon oxide layers, or a combination of at least one aluminum oxide layer and at least one silicon oxide layer. A single layer of aluminum oxide coated with a single layer of silicon oxide can be used. A plurality of silicon oxide layers and a plurality of aluminum oxide layers can be used. The oxide layer can comprise a plurality of silicon oxide layers and a plurality of aluminum oxide layers, alternately formed, one on top of the other.

The silicate topcoat can comprise a water-based silicate system, a water-based clear silicate system, a lithium and sodium silicate system, or the like. Formation of the silicate topcoat can comprise spraying the silicate topcoat material at any suitable rate and for a suitable duration to form a silicate topcoat having a thickness of from about 0.1 mil to about 2.0 mils, for example, a thickness of from about 0.5 mil to about 1.5 mils.

The multi-layer coating can be manufactured as a thin film having an adhesive backing and can be repaired and replaced easily on hardware without any complex bonding steps. The multi-layer coating can be applied to a substrate such as a flexible tape or blanket, and the method can further involve applying the tape or blanket to spacecraft hardware, such as a radiator, a planar panel, a combination thereof, or the like. The present invention also provides coated substrates and spacecraft hardware made by the methods described herein.

DETAILED DESCRIPTION OF THE INVENTION

The method of making a multi-layer coating on a substrate can first involve applying a mirror coating to a substrate. The mirror coating can be applied by first applying a reflective material to the substrate to form a reflective layer, and then applying an oxide layer to the reflective layer. The resultant mirror coating can comprise one or more additional layers, including a base layer, a protective outer coating, or the like. The oxide layer can comprise at least one layer of aluminum oxide, at least one layer of silicon oxide, or a combination thereof. The mirror coating can be applied by any suitable process. Metal and metal oxide vapor deposition techniques can be used. The method further comprises spraying a silicate topcoat onto the mirror coating. The formation of the mirror coating can be caused by vapor deposition whereas the formation of the silicate topcoat can be caused by spraying a silicate topcoat material onto the mirror coating.

The oxide layer can comprise a plurality of layers, for example, one or more aluminum oxide layers, one or more silicon oxide layers, or a combination of at least one aluminum oxide layer and at least one silicon oxide layer. A single layer of aluminum oxide coated with a single layer of silicon oxide can be used. A plurality of silicon oxide layers and a plurality of aluminum oxide layers can be used. The oxide layer can comprise a plurality of silicon oxide layers and a plurality of aluminum oxide layers, alternately formed, one on top of the other.

Prior to applying the mirror coating to a substrate, the substrate can first be coated with a base layer material to form a base layer on the substrate. The base layer can comprise a metal material layer, a metal layer, a primer layer, a metal alloy layer, a nickel chromium (NiCr) layer, a combination thereof, or the like.

After formation of the mirror coating on the substrate, a silicate topcoat material can be sprayed onto the mirror coating to form the multi-layer coating on the substrate. The silicate topcoat can comprise a water-based silicate system, a water-based clear silicate system, a lithium and sodium silicate system, or the like. Formation of the silicate topcoat can comprise spraying the silicate topcoat material at any suitable rate and for a suitable duration to form a silicate topcoat having a thickness of from about 0.1 mil to about 2.0 mils, for example, a thickness of from about 0.1 mil to about 1.0 mil, a thickness of from about 0.5 mil to about 1.5 mils, a thickness of from about 0.4 mil to about 0.6 mil, or a thickness of about 0.5 mil.

The mirror coating can comprise, for example, a reflective material layer of from about 500 Å to about 3,000 Å, for example, from about 1,000 Å to about 1,500 Å, or of about 1,200 Å. The mirror coating can comprise an oxide layer having a thickness of from about 2,000 Å to about 25,000 Å, for example, from about 10,000 Å to about 20,000 Å, or from about 15,000 Å to about 17,000 Å. The oxide layer can comprise a plurality of aluminum oxide sublayers, each having a thickness of from about 100 Å to about 200 Å. The oxide layer can comprise a plurality of silicon oxide sublayers, for example, each having a thickness of from about 25 Å to about 100 Å. The total thickness of the aluminum oxide sublayers can be from about 10,000 Å to about 15,000 Å. The total thickness of the silicon oxide sublayers can be from about 3,000 Å to about 5,000 Å. An indium tin oxide layer having a thickness of from about 50 Å to about 300 Å, for example, of about 100 Å, can be applied on top of the oxide layer and prior to application of the sprayable silicate topcoat material.

The reflective material can comprise a reflective metal, for example, silver, aluminum, titanium, or the like. A layer of Goddard Silver Composite Coating (CCAg), can be used.

Multi-layer coatings according to various embodiments can comprise a single layer or alternating, multiple layers of aluminum oxide, silicon oxide, or a combination thereof. The layer or layers can be deposited on a flexible substrate, for example, on a tape, a film, a blanket, an aluminum substrate, a titanium substrate, a metal substrate, a metal alloy substrate, a composite substrate, an adhesive tape substrate, a carbon fiber substrate, a flexible polyimide film, a combination thereof, or the like.

Exemplary polyimide films that can be used as substrates include the KAPTON® family of films and substrates available form E. I. du Pont de Nemours of Wilmington, Del. KAPTON® DR films and substrates, and KAPTON® HN films and substrates, can be used and are available from E.I. du Pont de Nemours and Company, Wilmington, Del. The composite coating can be formulated to yield emittance values of 0.78 when formed to be 3.2 microns (32,000 Å) thick on a KAPTON® HN substrate. At more typically composite coating thicknesses, for example, of approximately 24,000 Å, a modified multilayer coating can exhibit an emittance of 0.73. The composite coating can be deposited onto a conductive substrate, such as KAPTON® DR or another polyimide-based conductive film or substrate.

Each of the layers of the mirror coating can be deposited independently by any manner known to those of skill in the art, including by the use of electron beams, vacuum environments, oxygen environments, sputtering techniques, resistive coating techniques, and the like. Electron beam deposition techniques can be used, for example, to deposit the aluminum oxide layers and can also be used to deposit other layers, for example, in a vacuum environment or in an oxygen gas ($O_2$) environment. The metal of the reflective layer, for example, silver, can be sputtered, electron beam-deposited in a vacuum, or deposited by a resistance technique wherein the metal of the reflective layer is, for example, initially disposed in a tungsten boat. By running a current through the boat, the reflective layer metal can be heated to the point of sublimation and/or evaporation with the resultant vapor phase material being deposited to form a thin layer. If an Indium Tin oxide (ITO) layer is included, the ITO layer can be sputtered or deposited by using an electron beam in a vacuum. In some embodiments a silicon oxide layer is included and can be formed by depositing a silicon monoxide (SiO) material in an oxygen ($O_2$) containing environment such that a resultant layer of $SiO_2$ is formed. Other techniques can also, or instead, be used, as are known to those of skill in the art.

The multi-layer coating can be manufactured as a thin film having an adhesive backing and can be repaired and replaced easily on hardware without any complex bonding steps. The adhesive backing can comprise a pressure sensitive adhesive (PSA). The composite coating can be made into a structure that exhibits only 35%, 42%, or 50%, respectively, of the mass of: an OSR mirror; silver TEFLON® tape at a 5 mil thickness; or typical silicate paint. The multi-layer coating can be produced at a fraction of the cost of an OSR mirror. The cost savings can be significant given that normal spacecraft have up to 30,000 square inches of OSR mirrors on radiator panels. The multi-layer coating can be used on thermal hardware and can replace OSR mirrors, silver Teflon tape, and white thermal paints where such materials are used on private and commercial spacecraft, spacesuits, and blankets.

The method of the present invention can further comprise applying a flexible thermal controlled material to spacecraft hardware. For example, when the multi-layer coating on a substrate comprises a thermal control coating on a flexible tape, the methods of the present invention can involve applying such a tape to spacecraft hardware. The thermal control coating tape can be applied to a radiator, a planar panel, a blanket, a combination thereof, or the like. The present invention also provides coated substrates made by the methods described herein.

The method of the present invention employs sprayable silicate-based systems combined with previously developed thin film second surface mirror architecture to provide a higher IR emittance and stable thermal coating system that can be used for high heat rejection radiator systems. These systems can be deposited directly onto hardware surfaces or onto carrier films that can be attached to hardware or blankets directly. The developed radiative system can be configured to provide solar absorptance and IR emittance properties similar to those of optical solar reflectors (OSRs), but with significantly less mass, less production costs, and less scheduled requirements. On a carrier film, the material can be cut by hand to any shape and can be attached to underlying hardware using standard pressure sensitive adhesives. The system can be made to be electrically dissipative to meet surface charging requirements. The system can be co-cured onto composite substrates of various geometries, various substrate surface curvatures, and various surface roughness, to provide a heat rejecting surface. The system can be applied to a carrier film of any suitable size, for example, in ten-square-foot sections, but can be scaled up significantly as desired. The costs of production and application to hardware can be less than about one-half the cost of standard OSR systems.

The composite system can comprise a two-part system that includes a thin film second surface mirror followed by a sprayable clear silicate topcoat. The sprayable silicate topcoat can comprise the same topcoat material that is used as part of the silicate binder systems of aerospace white silicate coatings. The silicate topcoat can be clear and transparent in the visible spectrum, thereby allowing incident solar light to pass through the topcoat and onto the thin film underlayer where it is reflected back. The silicate topcoat is not transparent in the 3-35-micron IR spectrum and thus boosts the overall IR emittance of the coating over those properties of the thin film underlayer coating. Even a very thin application on LiNa33 by the "rub priming" method is able to change the emittance of a thin film coating from 0.35 to 0.70 without increasing the initial solar absorptance of the coating.

The thin film system includes a partial or complete Goddard Silver Composite Coating or CCAg with either a silicon dioxide or aluminum oxide/silicon oxide thin film coating on top of a silver layer. The thin film coating can be applied by thermal evaporation, electron beam evaporation, sputtering, or the like. One or more of the thin layers can be deposited independently by any manner known to those of skill in the art, including, for example, by use of electron beams, vacuum environments, oxygen environments, sputtering techniques, resistive coating techniques, and the like. Electron beam deposition techniques can be used, for example, to deposit the aluminum oxide layers and can also be used to deposit other layers, for example, in a vacuum environment or in an oxygen gas ($O_2$) environment. A reflective layer, for example, comprising silver, can be sputtered, electron beam-deposited in a vacuum, or deposited by a resistance technique wherein metal of the reflective layer is, for example, initially disposed in a tungsten boat. By running a current through the boat, the reflective layer metal can be heated to the point of sublimation and/or evaporation with the resultant vapor phase material being deposited to form a thin layer. An ITO layer, for example, can be sputtered or deposited by using an electron beam in a vacuum. In some embodiments a silicon dioxide layer can be formed by depositing a silicon monoxide (SiO) material in an oxygen ($O_2$) containing environment such that a resultant layer of primarily $SiO_2$ is formed. Other techniques can also, or instead, be used, as are known to those of skill in the art.

The thin film can be applied to either the substrate or to a flexible film, for example, a polyimide tape such as KAPTON® HN. Upon this deposited thin film, a sprayable water-based silicate coating is applied. The silicate coating can comprise AMSENG product LiNa33, a lithium and sodium silicate system available from Applied Material Systems Engineering, Inc. (AMSENG) of Schaumburg, Ill. The silicate system can first be applied by hand using a rub-priming technique common to silicate coating applications. Then the system can be applied by spray gun to the surface. As an example, the system can be applied via high volume low pressure spray gun, as is common in the art. Thickness can be controlled to the desired properties and normal IR emittance can exceed 0.85 with less than 0.5 mil of dry-film thickness.

The method and coating system can use both thin film deposited systems and a sprayable silicate system to provide for a stable, low solar absorptance, high IR emittance coating system that is flexible and durable enough to be applied to a carrier film that can be bonded to a variety of contoured surfaces. The system has a higher IR emittance than OSR systems and is significantly more stable than white silicate coatings. The system bleeds electrostatic charge buildup and can be made to meet surface resistivity requirements of 1E6 ohm/square without sacrificing a low solar absorptance or stability.

The combination of the thin film technique followed by application of a sprayable coating can use known stable materials to boost IR emittance on thermal control surfaces.

The LiNa33 product and other similar silicates have increased IR emittance when applied as thin films, without significantly increasing the solar absorptance or impacting the optical stability of the film. The performance of the system can rival or exceed the standard OSR and has many additional benefits over existing systems. The system affords a user an easy-to-apply product, for example, that can be applied by a peel and stick application, that is more flexible, more durable, lighter, and less expensive than existing systems. The product can be cut to fit any shape, using standard scissors. Application can be accomplished in only a fraction of the time for processing as compared with standard OSR application techniques or the application of a sprayable white coating. The application can be done just prior to launch or thermal vacuum testing. Additionally, the product has lower solar absorptance and greater optical stability in radiation, UV, and atomic oxygen environments.

The product does not represent a particulate or molecular contaminant risk due to its purely inorganic composition. The product can bleed surface charge far better than white silicate, silicone, or polyurethane coatings. Additionally, the product can be made by co-curing onto a composite structure, thereby allowing integrated processing with highly structural bonds at early integration and fabrication steps. Such complex structures are not conducive to sprayable or OSR-based thermal coating applications.

The coating system of the present invention can be used widespread throughout the aerospace community for all thermal radiative surfaces, especially those that rely on low solar absorptance and high IR emittance properties, for example, radiators.

The coating system on a supported film can rival or exceed properties of silver-backed Teflon (Ag/FEP) systems and can be a direct replacement of Ag/FEP systems in many applications. The coating system can also be used to close out OSR systems on larger OSR radiators or can be a direct replacement for those items. Additionally, the higher emittance optimized coating systems of the present invention can be used as direct replacements for white coatings on simple structures. The direct deposition method onto hardware can be a direct replacement for sprayed white coatings for many applications, depending on the surface finish of the hardware to be coated.

According to various embodiments, the coating system can be applied to and supported by a polyimide film. The coated film can be used to close out or replace Ag/FEP systems, for example, on radiators. The coated film can close out or replace Ag/FEP coatings currently used on Space Systems Loral (SS/L) communication panel radiators. Coated film products of greater than 2 square meters can be used on surfaces such as solar array yokes, or the coating system can be applied as a co-cured composite system in places where CCAg is currently used. The coating system can be used to replace current OSR radiators on multiple smaller radiators. The coating system can have widespread use in DoD and commercial aerospace applications, for example, as a direct replacement of Ag/FEP and OSR radiators on payloads and buses in various environments. Many NASA programs can use the coating system for enhanced IR emittance on existing CCAg-based radiator systems, on Ag/FEP radiators, or as an outer cover of a multilayer insulation (MLI) blanket.

The entire contents of all references cited in this disclosure are incorporated herein in their entireties, by reference. Herein, the term "about" means within a range of from plus 5% to minus 5% the value modified. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making a multi-layer thermal control coating to increase IR emittance of spacecraft hardware; said method comprising:
    providing a substrate made of a polyimide film;
    applying a mirror coating to said polyimide substrate, the step of applying the mirror coating including the steps of:
        applying a reflective material made of a silver composite material to the polyimide substrate to form a reflective layer, and
        applying an oxide layer to the reflective layer to form a mirror coating, the step of applying said oxide layer including
            first applying a first oxide layer of one of aluminum oxide and silicon oxide and then secondly applying a second oxide layer of the other of said aluminum oxide and silicon oxide; and
    spraying a clear silicate topcoat onto the mirror coating; and
    disposing said substrate and multi-layered thermal control coating on said spacecraft hardware thereby increase IR emittance to at least 0.78; wherein
    said steps further comprising first applying a base layer material to the substrate to form a base layer, and then applying the mirror coating to the base layer wherein the base layer comprises nickel chromium (NiCr); and
    the step of applying an indium tin oxide layer having a thickness of from about 50 Å to about 300 Å on top of said oxide layer prior to said step of spraying said clear silicate top coat.

2. The method of claim 1, wherein the step of applying said oxide layer comprises applying a plurality of aluminum oxide layers and a plurality of silicon oxide layers.

3. The method of claim 2, wherein at least some of the silicon oxide layers are dispersed between some of the aluminum oxide layers.

4. The method of claim 2, wherein the silicon oxide layers and the aluminum oxide layers are alternately formed, one on top of another, to form the oxide layer.

5. The method of claim 1, wherein the silicate topcoat comprises a water-based silicate system.

6. The method of claim 1, wherein the silicate topcoat comprises a lithium and sodium silicate system.

7. The method of claim 1, wherein the step of applying said reflective material forms said reflective layer having a thickness of 500 Å to 3,000 Å; the step of applying said oxide layers forms said oxide layer having a thickness from about 2,000 Å to 25,000 Å; wherein the total thickness of the aluminum oxide sublayers being from about 10,000 Å to about 15,000 Å and said total thickness of said silicon oxide layer being from about 3,000 Å to about 5,000 Å; and the step of spraying the silicate topcoat comprises forming a topcoat having a thickness of from about 0.2 mil to about 1.0 mil.

8. The method of claim 1, wherein the spraying the silicate topcoat comprises forming a topcoat having a thickness of from about 0.4 mil to about 0.6 mil.

9. The method of claim 1, wherein the spraying the silicate topcoat comprises forming a topcoat having a thickness of about 0.5 mil.

10. The method of claim 1, wherein the substrate comprises a polyimide tape and the method comprises forming a thermal control coating tape.

11. The method of claim 10, further comprising applying the thermal control coating tape to spacecraft hardware.

12. The method of claim 10, further comprising applying the thermal control coating tape to a radiator.

* * * * *